United States Patent [19]

Leatherman

[11] 4,239,575
[45] Dec. 16, 1980

[54] METHOD AND APPARATUS FOR MOVEMENT OF HEATED THERMOPLASTIC ELEMENTS FOR SHEAR-FUSION BONDING OF SUCH THERMOPLASTIC ELEMENTS

[75] Inventor: Alfred F. Leatherman, Columbus, Ohio

[73] Assignee: William C. Heller, Jr., Milwaukee, Wis.

[21] Appl. No.: 955,142

[22] Filed: Oct. 26, 1978

[51] Int. Cl.³ .............................................. B29C 9/02
[52] U.S. Cl. ................................. 156/272; 156/73.5; 156/292; 156/309.6
[58] Field of Search ................... 156/73.5, 73.6, 306, 156/272, 320, 304

[56] References Cited

U.S. PATENT DOCUMENTS

| | | | |
|---|---|---|---|
| 3,727,289 | 4/1973 | Bemelmann et al. | 156/304 |
| 3,860,468 | 1/1975 | Scherer | 156/73.5 |
| 3,960,636 | 6/1976 | Moffitt | 156/306 |
| 4,035,547 | 7/1977 | Heller et al. | 156/272 X |

*Primary Examiner*—David A. Simmons
*Attorney, Agent, or Firm*—Andrus, Sceales, Starke & Sawall

[57] ABSTRACT

A shear-fusion bond method is provided to create a direct fusion joinder or bond over an extended interface between like thermoplastic elastomeric elements of a block copolymer having a rubber-like center or midblock and styrene end blocks. Such material has a high melt viscosity and does not readily flow. The interface surfaces are coupled to a heat source and heated to a fusion bonding temperature, thereby softening the interface material so that it flows under pressure. The elements, with the surfaces in pressurized engagement, are rotated relative to each other about an axis which is normal to the interface. Rotation is through an angle of at least 10 degrees to subject the softened interface material to a high rate shear force movement substantially in the plane of the interface. This decreases the viscosity and causes the interface material to bondably flow. The interface surfaces are firmly held together while in the bondably flowing state to create a shear-fusion bond in which the interface disappears. The surfaces may be separately heated on a hot platen and then located in abutting engagement for rotation. The surfaces may also be provided with appropriate heat generating particles. The surfaces are inductively heated from a suitable field source to soften the interface, and then rotated.

32 Claims, 8 Drawing Figures

U.S. Patent   Dec. 16, 1980   Sheet 1 of 2   4,239,575
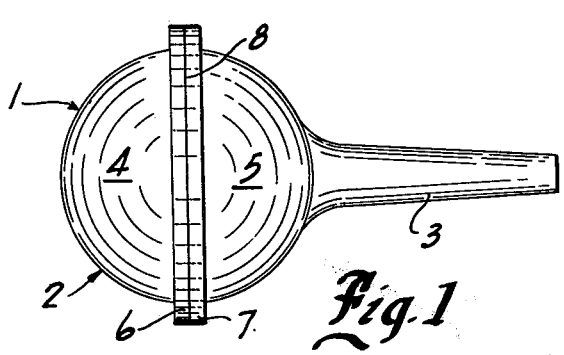
Fig. 1
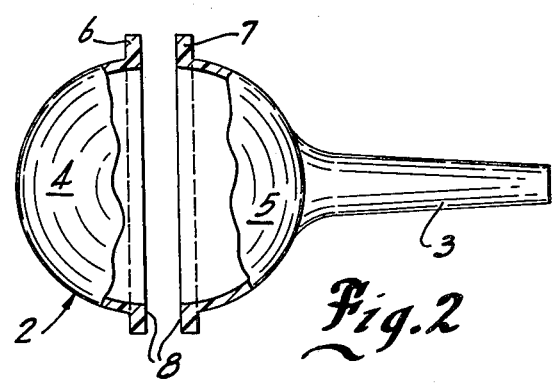
Fig. 2
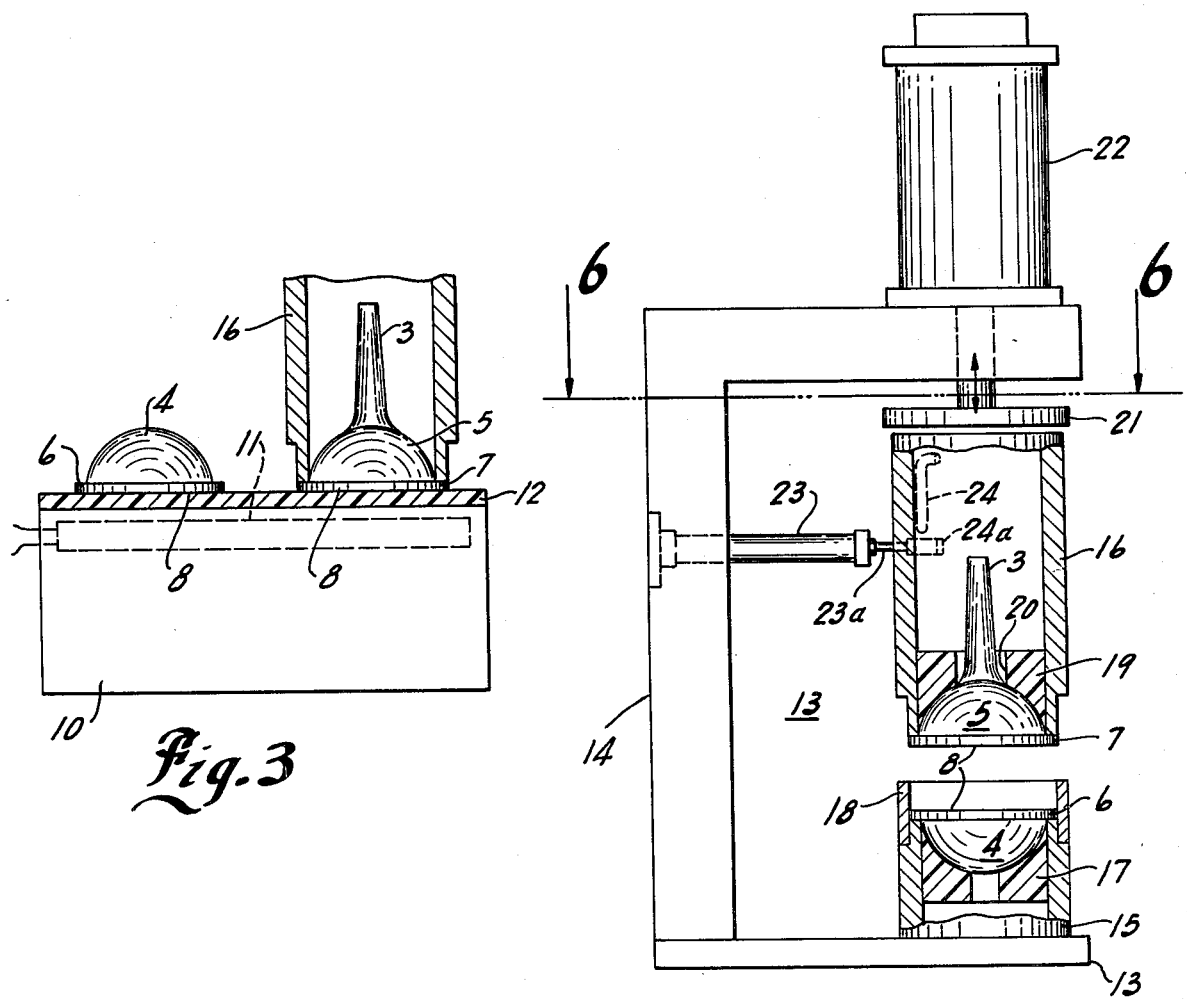
Fig. 3
Fig. 4

METHOD AND APPARATUS FOR MOVEMENT OF HEATED THERMOPLASTIC ELEMENTS FOR SHEAR-FUSION BONDING OF SUCH THERMOPLASTIC ELEMENTS

BACKGROUND OF THE INVENTION

The present invention relates to an improved fusion bonding method and apparatus employing shear stress movement of the heat softened interface material at the fusion bonding interface of plastic elements.

The development of various plastic materials has resulted in a development of various methods of joining plastic elements to each other. In addition to the use of adhesives, fusion sealing and joining of plastic surfaces is well known wherein the surfaces are melted and joined under pressure to form a weld or fusion bond. The present inventor and assignee of this invention have been involved in the development of an unique fusion bonding of plastics and have developed various techniques for improving of a fusion bond involving plastic materials. For example, a particularly satisfactory method and system for internal heating of plastics for bonding is shown in U.S. Pat. No. 3,574,312 to Heller et al wherein discrete susceptor particles are introduced into the fusion interface material and subjected to a high frequency magnetic induction field. The particles react to the field to generate heat within the plastic material which is rapidly heated to a molten or softened and flowable state to permit a fusion bonding of the surfaces. As disclosed in the above and other patents, many factors and mechanisms must be considered in fusion bonding of plastic surfaces, including the particular plastic materials involved. For example, fusion bonding may be generally improved as disclosed in U.S. Pat. No. 3,941,641 to William C. Heller, Jr. et al by agitation or vibration of the molten material. A vibratory force is also advantageously employed to solve certain specific problems such as where air spaces and the like might be introduced into the area which would interfere with an adequate bond. Such a system as applied to a book binding application is disclosed, for example, in U.S. Pat. No. 3,925,126. The above as well as various other prior art discloses the many facets and difficulties associated with fusion bonding of plastics. Further, the development of particular plastic materials has created various particular problems. For example, the applicant's co-pending application entitled METHOD OF FUSION BONDING NON-ELASTOMERIC THERMOPLASTIC ELEMENTS WITH A BLOCK STRUCTURE ELASTOMERIC BONDING ELEMENT INTERPOSED AT THE BONDING INTERFACE with Ser. No. 832,970 which was filed on Sept. 13, 1977 discloses a particularly advantageous concept of employing a particular thermoplastic elastomer, generally having a dual olefin center block with styrene end blocks molecular structure, as a bonding agent for bonding of other dissimilar and nonelastomeric plastic elements. A particularly satisfactory material is a block polymer sold by Shell Chemical Company under the trademark Kraton G. Such elastomeric material also has properties which adapts it for production of various molded articles and as a conventional adhesive or hot melt sealant wherein it forms a physical attachment to other dissimilar surfaces to form a separate distinct interconnecting layer. Where such elastomeric material is used for the several parts of elements of a unit, difficulty has been found in providing a satisfactory fusion bonding of the like material together. The difficulty appears to be related to the molecular characteristic of the material. In the molding of such material, it is known that high shear rate molding methods should be employed. Thus, the molecular structure of the material is such that even though it is raised to a melting temperature, the viscosity of the melt is such that the material remains effectively as a solid, and does not gravity flow. However, by employing forced-flow methods, shear stress movement is created within the material which rapidly changes to a flowing state suitable for injection molding as well as transfer and extrusion molding processes. Shell Chemical Company has published literature indicating that the material Kraton G has a viscosity in the order of 100,000 to 500,000 poises, even with the material at or above its normal melting temperature. Typically for injection molding, a reciprocating screw machine is employed to move the material with a shear of the material which converts the material into a suitable flowing state for molding.

Fusion bonding of such material by heating to the melting temperature and applying pressure across the interface with a resulting flow of the material however does not result in a satisfactory fusion bond. A satisfactory or complete fusion bond is defined as one in which the material or elements do not separate by failure on the original plane, but rather by tearing along an unpredictable surface, as more fully discussed hereinafter. In fact, heating the material to a sufficient temperature level and time to otherwise effect any fusion bonding may result in charring the material. The failure to obtain a fusion bond between the two like high melt viscosity elastomeric materials is apparently because the molten or softened material, which does not flow laterally, does not, however, flow with the necessary shear characteristic even though under a clamping pressure and softened to a sufficient degree to otherwise form a true fusion bond and can be readily separated by hand printing at the interface.

SUMMARY OF THE PRESENT INVENTION

The present invention is particularly directed to a method and apparatus for fusion bonding of thermoplastic elements which includes a positive shear movement of the softened interface bonding material to produce a complete and actual fusion bond between the elements, and particularly to the bonding of thermoplastic elements having a block molecular structure creating a high melt viscosity at the melting temperature which prevents effective bondable flow at melting temperature. In accordance with the present invention, a heat source is applied to the bonding interface of the thermoplastic elements to be joined and the interface is raised to the melt temperature to change the interface material to a softened and flowable state when subjected to pressure. With the interface material in such a softened state and in contact with one another, the elements are moved relative to each other to positively introduce a shear stress movement within the softened interface material. The physical movement of the elements is at a sufficient rate and distance to introduce shear which causes the material to flow and thereby effect a shear-fusion bond. The present invention has been particularly applied to bonding of the thermoplastic elastomeric elements having a molecular structure which essentially prevents free flow of the material even when heated to a softening temperature, and more particularly to block polymers. In order to create an effective fusion bond over an extended interface of like elastomeric plastics such as the block polymer Kraton G which typically has a rubber-like center block and styrene end blocks, the special shear stress movement of the softened interface has been found essential and in fact critical to creation of any significant fusion bond. However, as thermoplastic materials generally exhibit some shear stress response characteristic, the present invention may be found useful in other fusion bonding of thermoplastic elements. The block polymers such as the Kraton material of Shell Chemical Company which has a rubber center or mid-block and styrene end blocks, and the Solprene material of Phillips Petroleum Co., Bartlesville, Okla., U.S.A. which has an isoprene mid-block and styrene end block have not been effectively and repeatedly fusion bonded to themselves prior to the use of the present invention. Further, a particularly unique and practical method and apparatus to produce the necessary shear movement within the interface includes relatively rotating the two elements about an axis essentially normal to the plane of the interface. A substantial angular movement and movement rate was found to be significant in the creation of optimum bonds over an extended interface surface.

When employing the susceptor particles or other form of internal heating, the elements may be assembled and subjected to a high frequency magnetic induction field, or other appropriate field, to raise the interface to an appropriate temperature. While at such temperature, a force is applied to the elements to cause a relative physical movement between the heated parts or elements, generally in the plane of the interface. In the method employing internal heating, an interposed bonding element, appropriately loaded with the heat generating particles, may be employed, generally as disclosed in the previous Heller U.S. Pat. No. 3,574,312.

The flow associated with the creation of the shear forces may result in the lateral movement of the pressurized softened material into a projecting mass. If desired, suitable separate retainers, or even integrally molded dams or retainers may be provided to confine the interface material and thus prevent formation of such masses.

Alternatively, a highly satisfactory bonding method employs the separate application of heat to the opposed interface surfaces of the elements, followed by the rapid superposition of the surfaces into pressurized abutting engagement and relative movement between the elements while the surfaces are still sufficiently softened to permit the shear movement within such surfaces. In one particular practical embodiment the elements were moved rapidly from a hot plate into a fixture, forced moderately together and rapidly rotated relative to each other through a partial revolution. The inventor has found that a rotation above 10 degrees generally noticeably improves the bond and rotation as small as 20 degrees provided a significant improvement in the fusion bond, and in fact, a complete fusion bond.

The plastic members may of course also be readily mounted in a suitable two piece support or fixture. The fixture is opened, and a hot plate unit located between the members to effect the heating to an appropriate degree or melt temperature. The hot plate is then removed and the fixture closed to move the surfaces into contact, and then rapidly rotated or otherwise moved to effect the desired shear stress movement.

The inventor has found that the heat retention characteristics of the elements are such that ample time is available for movement of the members from a hot source to an appropriate pressure and rotating fixture to permit the desired fusion bonding.

The inventor has found that the actual physical relative movement of the parts when conducted according to this invention creates the necessary shear stress movement of the material to effect a highly effective fusion bond of a high melt viscosity material such as the particular thermoplastic elastomer Kraton G and the like.

BRIEF DESCRIPTION OF DRAWINGS

The drawings furnished herewith illustrate a preferred construction of the present invention in which the above advantages and features are clearly disclosed as well as others which will be readily understood from the following description.

In the drawings:

FIG. 1 is an elevational view of a syringe formed of a two piece molded plastic construction adapted to use a method in accordance with the teaching of the present invention;

FIG. 2 is an exploded view of the molded components to form the syringe of FIG. 1;

FIG. 3 illustrates a first step in a method of fusion bonding of the components of FIG. 2 to form the syringe of FIG. 1;

FIG. 4 is an opened view of a fixture for receiving the components of FIG. 3;

DESCRIPTION OF THE ILLUSTRATED EMBODIMENTS

Figure 5:
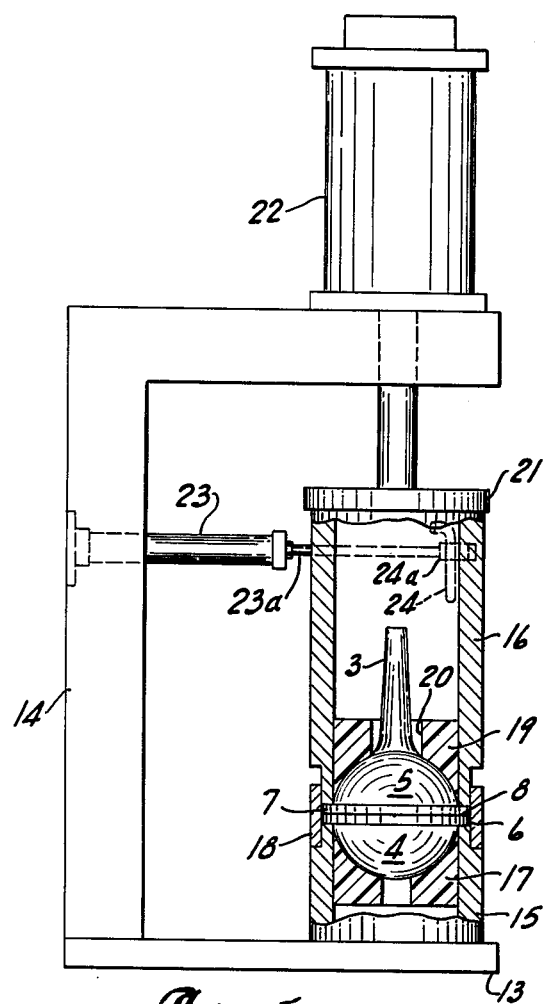
FIG. 5 is a side view of the fixture shown in FIG. 4 in the closed state.

Referring to the drawings and particularly to FIG. 1, the present invention is illustrated as applied to the forming of a conventional medical syringe 1 having a bulb 2 and an integral nib or spout 3 which projects outwardly therefrom. The syringe may be formed of a suitable resilient plastic as a two-piece molded assembly including an outer dome 4 and an opposed cup-shaped base 5 to which the spout 3 is integrally molded. Generally, the dome 4 and the base 5 are formed with edge flanges 6 and 7 defining the bonding interface 8 over which the members are to be joined. Thus, the two parts or elements 4 and 5 are molded or otherwise formed with the common dividing plane or interface bond surfaces 8 through the bulb 2. The elements 4 and 5 may be readily molded by any conventional method. For example, the syringe is advantageously formed of a thermoplastic elastomer, such as manufactured by Shell Chemical Company under the trademark Kraton G, and a particularly satisfactory Kraton G 2705 material is shown in the company's technical bulletin SC:40-77. As noted therein, Kraton G material is adapted to suitable molding processes employing a high rate shear method of molding including injection molding, as well as certain methods of transfer molding and extrusion. As described therein, a typical injection molding condition for such a material will use a reciprocating screw machine in order to provide the necessary shear characteristic within the material to permit flow of the material for molding. A medical syringe 1 may be subject to heat sterilization and the resilient bulb 2 is, of course, periodically collapsed in use. The interface bond must maintain its integrity with such use. Although a very satisfactory material, because of its physical properties, difficulty has been encountered, however, in providing a highly effective bond of the dome 4 to the base member 5. The present inventor has found that a highly satisfactory fusion bond of the such elastomeric surfaces is created by heating the surfaces 8 to the melting temperature to soften the interface material, and then physically moving of the elements 4 and 5 with respect to one another to create a shearing movement of the softened material. The shearing forces and movement result in converting of the interface material to an appropriate flowable and bondable state, such that with the members subjected to a joining pressure, a highly effective fusion bond can be obtained. The relative physical movement to create the shear movement of the molten material may be provided in any desired manner. However, a particularly practical method is an actual physical movement of the individual elements 4 and 5 relative to each other, and particularly in the general plane of the interface 8. Various embodiments of apparatus for effecting such a movement are presently described as indicative of the wide variety of apparatus which might be employed. In particular, FIGS. 3–7 illustrate a hot plate or platen method of heating in combination with a particularly unique and practical rotational means for introducing the shear stress movement into the softened interface bonding material.

Referring to FIG. 3, a conventional hot plate unit 10 is illustrated including an internal electrical heating element 11 adapted to raise the upper surface thereof to an effective high temperature. The top hot surface is formed as a flat surface having a coating or separate cover 12 of "Teflon" or other suitable material to which the syringe plastic, Kraton G 2705, does not readily adhere. For example, a 5 mil cover was employed in practicing the invention as hereinafter described. Although it is difficult to fusion bond Kraton G material to itself, the material may bond to other dissimilar materials and surfaces.

Figure 6:
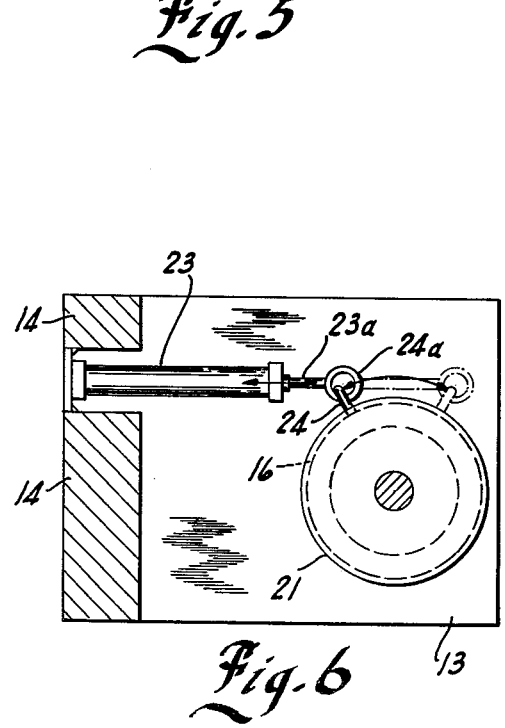
FIG. 6 is a plan view of the fixture shown in FIGS. 4 and 5.

As illustrated in FIG. 3, the dome 4 and the base 5 are located on the upper surface of the hot plate, with the interface planar surfaces 8 resting on the flat surface 12. The heating is effected for a predetermined period of time to raise the temperature of the flanges 6 and 7 to a melting temperature such that they move or flow when downward pressure is applied to the element. This is well below the temperature which will cause charring but at or above the necessary bonding temperature. The dome 4 and base 5 are then transferred to the bonding fixture or apparatus 13, such as illustrated in FIGS. 4–6 with interface surfaces 8 of the flanges 6 and 7 in a softened state. Although softened, they substantially retain the original shape as a result of the molecular structure which overcomes gravity forces.

More particularly as shown in FIGS. 4–6, the fixture or apparatus 13 includes a supporting framework 14 with a lower dome support 15 fixed to the framework and an upper moveable base support 16. The lower dome support 15 is shown as a cylindrical member within which a cup-shaped member 17 is secured with an inner concave surface generally corresponding to the configuration of the dome 4. The dome 4 is located in member 17 with flange 6 resting on the upper surface thereof. The outer periphery of the support 15 is recessed to receive a ring retainer 18 which projects upwardly of the flange 6. The retaining ring 18 is constructed to provide a relatively close fit over the opposed outer edges of the upper and lower supports and thereby extends closely about the outer end edges of the flanges 6 and 7. This results in a confining of the material and prevents excessive squeeze out as hereinafter discussed.

The opposed upper support 16 is a similar cylindrical member having an inner contoured support member 19 with a central opening 24. The contoured base 5 conforms to the configuration of the member 19 with the spout 3 projecting through the opening 20. Support 16 is readily movable and may be assembled to the base member 5 before, during, or after the heating thereof. The support 16 is shown coupled to the base member during the heating and the assembly is then moved into position as shown in FIGS. 4 and 5. Thus, the resilient character of member 5 is such that it is held snugly within the support 16 for any position thereof.

The illustrated fixture includes a clamping bar or member 21 which is slidably mounted for a vertical movement above the top support 16. An air cylinder unit 22 is shown supporting the member 21 for applying a clamping force to the top of the base support 16.

The upper base support 16 includes a lower diameter which corresponds to that of the flange 7 and is telescopic into the retaining ring 18 in the closed position. Thus, the outer periphies of flanges 6 and 7 are confined during the pressure fusion bonding of the interface 8. The upper support 16 is thus moved downwardly and forces the flanges 6 and 7 into firm engagement under a predetermined loading which permits the relative rotation of the elements or members 4 and 5.

In the illustrated embodiment of the invention, a rotating mechanism includes a horizontal acting pneumatic piston-cylinder unit 23 mounted with its piston rod 23a moveable outwardly and coupled to a rod-like extension 24 on the support 16. In the illustrated embodiment, support 16 is shown with an offset rod or pin 24. Piston rod 23a has an end ring 24a aligned with and coupled with the pin. Actuation of the piston-cylinder unit 23 creates rotation of the upper fixture about the vertical axis through the members 4 and 5. If desired, the simple one way rotation can be replaced with a high speed oscillatory action at the interface by appropriate activation of the cylinder and the coupling of the piston rod to the support.

Thus, in operation, after the heating of the elements 4 and 5, they are manually positioned with the dome 4 resting in lower cup-shaped contour support 15 and the base 5 held in support 16. The upper support 16 is forced downwardly by the clamping member 21 to firmly hold flanges 6 and 7 together along the interface 8. The upper fixture 16 is rotated in a rapid manner through a selected angular movement, thereby rotating member 5 relative to the dome 4 and creating a significant shearing of the softened interface material. The softened material, at least at the start, appears to serve as a lubricant which aids the rotation of the one element with respect to the other. In actual practice, applicant has employed a top and a bottom support fixture 13 similar to that illustrated, with the pressure applied manually and the top fixture manually rotated through various angles. Typical results are shown in tables hereinafter set forth. The inventor has found that an angle as small as 20° has provided a significant improvement in the bond, and as hereinafter described, a fully realized fusion bond throughout the total interface area. Any degree of rotation, if provided at an appropriated rate and characteristic, introduces shear movement within the interface material but practical results appear to require movement at least equal to ten degrees. Movement between 20 and 120 degrees has been found to operate satisfactorily, although significantly greater rotation should be acceptable. Similarly, the rate of rotation is not critical. The manual rotation was generally monitored by creating rotation over certain portions of the heating cycle. A rotation speed generally of the order of 30 degrees per half section or 10 revolutions per minute was an effective rate, and should generally meet practical production specifications.

As previously noted, the movement of the interface results in a bondable flow characteristic, and with appropriate pressure across the unit, may result in a lateral movement of the softened material. The outer retainer ring 18 telescoped over opposed ends of the upper and lower supports 15 and 16 confines the material and maintains a smooth finished outer surface.

If internal squeeze out is unacceptable, for any reason, the inner surface of either or both elements 4 and-/or 5 may be provided with an internal dam or confining member. Such a structure may require a special heating plate to prevent heating of such dam member, which can of course be readily provided.

The selected embodiment of the invention illustrates various aspects of the present invention which have been found to require consideration and particularly illustrates the unique rotary motion applied within the softened interface material, and illustrates at least one practical application of the present invention. The present invention is, however, broadly applicable to the bonding of any plastic member as it is believed that the introduction of a shear stress movement should improve the flowability and movement characteristic of the material. The invention is, of course, essential to effective fusion bonding and joining to each other elements of Kraton G and like block-polymer materials.

Figure 7:
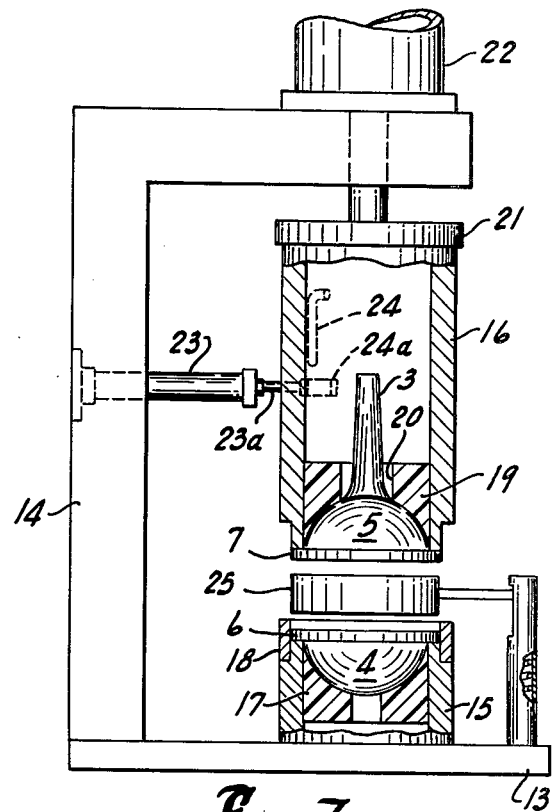
FIG. 7 is an opened view illustrating an alternate hot platen method of heating the members to be fusion bonded, with the shear stress movement of the softened interface normal to the plane of the interface.

Although the embodiment shown in FIGS. 3-6 has been used to effectively fusion bond like elastomeric elements, modifications may be provided. For example, an alternate embodiment, which corresponds in part to that previously described, is shown in FIG. 7 where corresponding elements are identified by corresponding numbers. In FIG. 7, the unheated elements 4 and 5 to be fusion bonded are located within the upper and lower supports 15 and 16 of fixture 13. A separate heating plate unit 25 is moveably mounted for location within the fixture as shown in FIG. 7.

The heating unit 25 is a double surfaced heating plate or platen. The supports 15 and 16 may be closed to clamp the elements 4 and 5 to the opposite faces of the heating unit 25 for rapid heating thereof to an appropriate temperature. The fixture is then opened, the hot plate unit 25 removed and the fixture again closed to establish clamping pressure across interface 8. The embodiment of FIG. 7 may be provided with the rotating mechanism as previously discussed for imparting the relative rotational movement. Alternatively, a vertical movement may be applied across the interface surface to provide a continuous compression and release of the softened materials so as to develop other shear force movement, or a combined movement may be employed.

The vertical moving force source may be generally similar to that shown in the previously identified U.S. Pat. No. 3,925,126. Alternatively, the piston-cylinder unit 22 may be actuated to reciprocate and function as a shear movement driver, as shown in FIG. 7. The cylinder unit 22 and the clamping plate 21 are directly coupled to the top of the support 16. The cylinder unit 22 is then actuated to physically move the upper support 16 and the interconnected bonding element 5. The molten or softened interface material 8 is thereby subjected to the alternate compression and expansion such that a shear force movement of such interface material may be created. The physical shearing of the separately heated and softened or molten interface material provides the desired bonding flow. This is in sharp contrast to various forms of vibratory welding and the like wherein motion has been applied to create heat.

Further, the invention can also employ a separate energy field coupled to the interface surface for heating of the interface material, such for example, as taught in the previously identified patents disclosing susceptor particles in the bonding interface. A modification to the fixture shown in FIGS. 4-7 for use in high frequency magnetic induction bonding is shown in FIG. 8, wherein elements corresponding to the previous embodiment are again identified by corresponding numbers.

Figure 8:
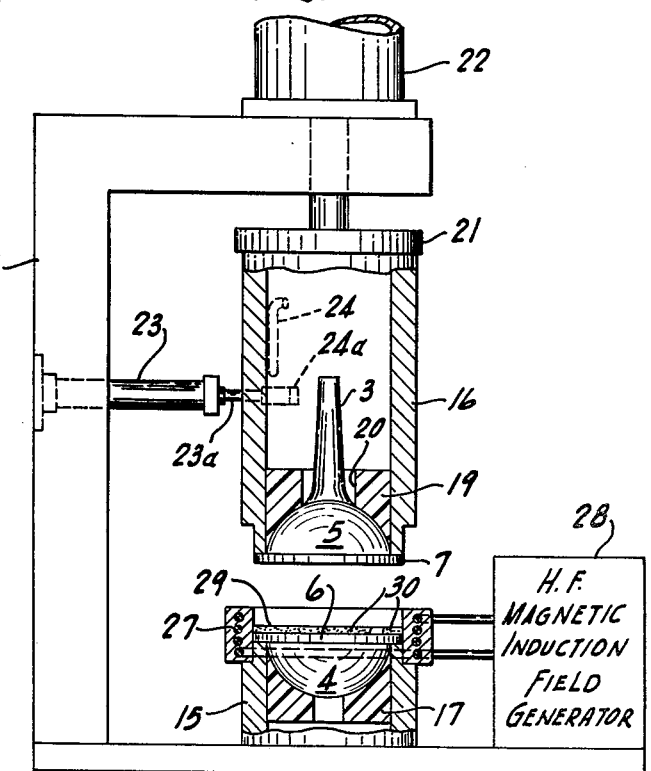
FIG. 8 is a view illustrating apparatus employing magnetic induction field heating to the bonding interface of the plastic components to the bonding temperature.

Referring particularly to FIG. 8, elements 4 and 5 are mounted in the lower and upper supports 15 and 16, respectively, of fixture 13, generally as in the previous embodiment. Upper support 16 is coupled directly to the positioning piston-cylinder unit 22 for raising and lowering of the support. Unit 22 also includes a coupling rod 24a coupled to the piston rod 24 of the piston-cylinder unit 23 for rotation of the support 16 and the element 5 to be bonded. In the embodiment of FIG. 8, a high frequency magnetic induction coil 27 is secured to the lower support 15 and located for encircling of the interface portions of the elements with the fixture 13 closed. The high frequency coil 27 is connected to a suitable high frequency current source 28.

In the embodiment of FIG. 8, a separate fusion bonding agent or element 29, formed of the same type of material as elements 4 and 5, is shown located between the flanges 6 and 7 of elements 4 and 5. The bonding agent 29 is loaded with uniformly dispersed particles 30 which are particularly selected to respond to the energy field established by the coil unit 27 to generate heat (i.e. susceptor particles). The particles could, of course, be dispersed throughout one or both of the flanges 6 and 7. A particularly satisfactory magnetic induction heating system is shown and more fully set forth in the previously identified U.S. Pat. No. 3,574,312 to Heller et al. Thus, particles 30 are preferably selected from the iron oxide class consisting of gamma $Fe_2O_3$ or $Fe_3O_4$. As disclosed in the previously cited art, the source 28 then preferably operates in a range of 2 to 7 MHz.

In the embodiment using susceptor particles, set forth in the following table, the bonding element 29, which is shown substantially thicker than generally employed for purposes of clarity of illustration, was loaded with 20% of gamma $Fe_2O_3$. The bonding element 29 was disposed between the bonding flanges 6 and 7 and the upper support 16 moved downwardly into a clamping engagement with element 29. Approximately 10 to 12

PSI air pressure was employed with a resulting 35 to 40 pounds of loading on the bond area. The bond area was approximately one (1) square inch. The high frequency source 28 was energized for various time periods, generally on the order of 3 to 5 seconds in one method of carrying out the invention, to heat the bonding element 29, and through heat conduction the adjacent flanges 6 and 7, to the desired temperature, thereby softening the bonding element 29 and the adjacent surfaces. The upper support 16 was rotated relative to the lower support 15, with an angle which varied within the range of 20 to 90 degrees. The elements 4 and 5 were molded and bonded without any special treatment of the surfaces such as washing, sanding, or the like. As shown in the following Table I, very excellent bonds were obtained when the present invention was used, in contrast to the absence of any bond when the invention was not used.

total interface area and which in separation did not follow the initial or any other fixed interface. Thus, in a excellent bond, the failure was random within the fusion bond area. A good bond was quite similar to an excellent bond except that in some areas the failure and separation occurred along the original interface between the two elements. A poor bond was one in which the failure and separation was essentially totally at the interface and in which the flanges were essentially separate and integral. None refer to bonds in which there was no significant connection between the flanges.

Thus, even with 20 degree rotation, a completely realized interface fusion bond of the flanges was obtained. The tabulated examples of carrying out the invention were made employing visual inspection of the bond area to determine when a softened interface was created, and emloying conveniently available heat energy sources. Production apparatus would employ vari-

TABLE I

High Frequency Shear-Fusion Bonding of High Melt Viscosity Plastic Elements

Bonding agents included 20% iron Oxide gamma $Fe_2O_3$ particles
Particle Sizes - sub to 20 microns
Substrate always Kraton G 2705
Size of substrate 2¼" dia., flanges ⅛" wide × 1/16" deep
Frequency 3.3 MHZ

| Number | Bond Agent | Coil (Amperage) | Heat (seconds) | Approximate Rotation (Degrees) | Compression (Pounds) On | Comment | Bond |
|---|---|---|---|---|---|---|---|
| 1 | Kraton G 2705 | 500 | 3 | None | 35 | | None |
| 2 | " | 500 | 3 | 20–30 | 35 | Very good bond | Good-Excellent |
| 3 | " | 450 | 3 | 20–30 | 45 | Over almost all bond area | Excellent |
| 4 | " | 500 | 3 | 40–50 | 35 | Rotated throughout heat cycle | Excellent |
| 5 | " | 500 | 3 | None | 35 | | None |
| 6 | Kraton G 1652 | 450 | 3 | 40–50 | 35 | | Good |
| 7 | Kraton G 2705 | 500 | 3 | 20–30½ | 35 | Rotation only last ½ second | Excellent |
| 8 | Kraton G 1650 | 500 | 3 | None | 35 | | None |
| 9 | " | 500 | 3 | 20–30½ | 35 | Rotation only last ½ second | Excellent |
| 10 | Kraton G 2705 | 450 | 3½ | 20–30 | 35 | Over almost all bond area | Excellent |
| 11 | " | 450 | 3½ | 40–50 | 35 | | Excellent |
| 12 | Kraton G 1652 | 450 | 3½ | About 60 | 35 | | Excellent |
| 13 | " | 500 | 4 | None | 35 | Bonding agent charred | None |
| 14 | Kraton G 2705 | 400 | 4½ | 20–30 | 35 | Not hot enough | Poor |
| 15 | " | 400 | 4½ | 20–30 | 35 | Faster rotation than #14 | Good-Poor |
| 16 | " | 400 | 5 | 40–50 | 35 | Rotation only last 2 seconds | Excellent |
| 17 | " | 400 | 5 | 40–50 | 35 | " | |
| 18 | " | 400 | 5 | None | 35 | | None |
| 19–21 | " | 400 | 5 | 40–50 | 35 | Rotation only last 1 second | Excellent (ALL) |

Similar results were obtained when the present invention was practiced using a hot platen heating means such as diagrammatically shown in FIG. 3. Typical results are shown in the following Table II.

TABLE II

Hot-platen Shear-Fusion Bonding of Plastic Kraton G 2705 Elements

| Specimin number | Temperature Setting of Hot platen, F | Dwell Time on Hot Surface, Secs. | Relative Rotation of Fixtures, degrees | Load Pressing on Bond surfaces, lbs. | bond |
|---|---|---|---|---|---|
| 22 | 550 | 20–25 | 20–30 | 25–30 | Excellent |
| 23 | 550 | 20–25 | none | 25–30 | None |
| 24 | 550 | 20–25 | 20–30 | 25–30 | Excellent |

In the tables, the bond is characterized as excellent, good, poor and none. The bonds were manually separated by initiating a tear or separating location generally centrally of the final bond, and the separated members were visually inspected with the following characterization applied: an excellent bond is that in which the elements fused into a single integrated mass over the ous devices and means for increasing the rate of softening. For example, the energy is preferably coupled to the plastic element using a suitable concentrating and reinforcing means, as in U.S. Pat. No. 3,462,336. Such apparatus in combination with a high amperage supply would permit heating of the plastic elements in a more practical and typical production heat cycle period of the order of ¾ of a second, with the rotation during the last ½ of a second. Syringes made with such typical cycles have withstood heating and bulb collapse cycling indicating an effective bond with a useful life adapted to commercial specifications.

The results set forth in the tables indicate that the values for the various factors are not critical. Thus, although the thermoplastic element must be significantly softened, a particular melt temperature is not required. Similarly, a significant rotation must be provided with the elements in the softened state, but the degree of rotation and the rate of rotation may include a wide range. These factors, which may also change with the particular plastic employed, can be readily determined for a preferred or optimum sequence for the particular thermoplastic element and the required available apparatus in a simple, routine development based on the teaching set forth above.

During the working of the invention, the interface material 8, unless confined, is squeezed out as a result of the clamping force. For example, in the illustrated embodiments, the softened material moved laterally from the bond area within the bulb element 2. Removal of excess material in the above manner can change the product dimensions and have other adverse effects. Applicant has found that a completely satisfactory method of bonding without significant lateral flow may be provided by applying the shear movement only during a terminal portion of the heat cycle or even immediately after the heat cycle. For example, the heat may be terminated within ½ second after the initiation of the shear force movement of the elements. This of course is also significant in practical production methods where a heat cycle or period as short as feasible is desired to maintain a high production rate. Further, the rotation creating the shear force movement of the material is responsible for the flowing condition. Consequently, if the period of the shear force movement is minimized, the flowing state is minimized and the lateral or squeeze-out flow will be correspondingly minimized. Thus, for example, if the time of rotation is limited to about ½ of a second at the end of the heating cycle, the squeeze-out is minimized. Further, holding the clamping force to a minimum necessary to effect an adequate bond also will minimize lateral movement of the softened interface material.

As previously described the present invention was developed in the process of bonding like block polymer thermoplastic elements to each other and particularly elements of Kraton G, a block polymer having a saturated olefin rubber midblock and polystyrene end blocks. However, other thermoplastic elastomers have block molecular structure of a rubber-like center block and styrene end blocks, and the present invention can be considered essential to fusion bonding such materials, which thus form a unique class to which the present invention is applicable. However, as thermoplastics generally exhibit some shear stress flow characteristic, the present invention may be advantageously employed in the art of fusion bonding thermoplastic elements. Although a definitive conclusion as to the mechanics of the improvement cannot be given, it would appear that an after-the-fact explanation is that the styrene end blocks, which would provide the bond, are not significantly aligned upon mere contact and compressive flow. However, when a significant engagement and bonding shear movement is created, the styrene end blocks are moved into engagement and create the desired direct fusion bond of one element to the other. The above explanation appears compatible with the molecular structure of the materials but is only given for proper consideration of the various factors which might be significant in use of the present method and apparatus for carrying out the invention.

Applicant has thus found that a non-shear related bond results in an article with insignificant fusion bonding or joinder between the two surfaces. In contrast, a bond formed with the shear movement of the interface material results in a firm and essentially continuous interface fusion bond in which the bonded members can be separated only by destruction of the interconnected substrates.

The present invention clearly provides a highly significant improvement in the method of fusion bonding like plastic members, and particularly the plastic members of the high melt viscosity molecular structured plastics such as the dual olefin center blocks with styrene end blocks such as Kraton G 2705 and the like.

Various modes of carrying out the invention are contemplated as being within the scope of the following claims particularly pointing out and distinctly claiming the subject matter which is regarded as the invention.

I claim:

1. A method of fusion bonding plastic elements over extended interface surfaces, comprising heating the interface material to a fusion bonding temperature from a separate thermal energy source and thereby softening the interface material of said plastic elements independently of movement of said elements, subjecting the softened interface material to a high rate shear force movement in the plane of the interface to lower the viscosity of the interface material and cause said interface material to bondably flow, said shear force movement being insufficient to establish significant heating of said interface, and holding the interface surfaces while in the flowing state in firm engagement to create a fusion bond.

2. The method of claim 1 wherein the step of subjecting the interface material to a shear force movement includes the step of rotating the elements relative to each other.

3. The method of claim 2 including rotating the element through an angle of at least 10 degrees.

4. The method of claim 2 including rotating the element through an angle of between 10 degrees and 120 degrees.

5. The method of claim 1, 2, 3, or 4 wherein the step of heating said interface surfaces includes separately heating of each surface and thereafter locating the surfaces in engagement and moving said elements for the subjecting of the softened interface material to the shear force movement.

6. The method of claim 1, 2, 3, or 4 wherein the interface surfaces are located in engagement during the heating step.

7. The method of claim 6 wherein the heating step includes the dispersion of heat generating particles throughout one of the elements and applying a high frequency energy field to said element.

8. The method of claim 7 wherein said particles are selected from the class consisting of gamma $Fe_2O_3$ and $Fe_3O_4$.

9. A method of fusion bonding like plastic elements having a high melt viscosity over extended interface surfaces, comprising heating the interface material to a fusion bonding temperature from a separate thermal energy source independently of the movement of said elements and thereby softening the interface material of said plastic elements, holding the interface surfaces while in the softened state in firm engagement, moving the elements relative to each other in the plane of the interface and thereby subjecting the softened interface material to a high rate shear force movement in the plane of the interface with the softened surfaces in engagement to lower the viscosity of the interface material and cause said interface material to bondably flow, and then cooling the interface to create a fusion bond.

10. The method of claim 9 wherein the interface material flows laterally of the interface and including the step of terminating the heating of the interface material in timed relationship to the lateral flow of the interface material to reduce the lateral flow of the interface material.

11. The method of claim 9 or 10 including the insertion of a bonding element of the same material as the plastic elements, said bonding element including particles responsive to an energy field to generate heat, said heating including the creation of said energy field.

12. The method of claim 11 wherein the particles are substantially uniformily dispersed.

13. The method of claim 11 wherein the energy field is removed in timed relationship to the step of subjecting the interface material to a shear force movement.

14. The method of claim 9 wherein said elements are formed of elastomeric polymer having a molecular structure creating a high viscosity at all temperatures below a charring temperature and thereby preventing gravity flow as the result of heating only.

15. The method of fusion bonding thermoplastic elastomeric elements formed of block polymers having center blocks and end blocks, said elements having opposed interface surfaces, comprising applying heat to each of said interface surfaces to raise the temperature to a melt temperature and thereby softening the interface surfaces, mounting the elements with the softened surfaces in engagement, applying a clamping pressure across the softened interface surfaces, and rotating the heated elements relative to each other on an axis substantially perpendicular to the interface with said interface surfaces in said softened state at a sufficiently rapid rate with said clamping force applied to create shear force movement of the softened interface surfaces and thereby creating a bonding flow of the softened surfaces to create complete fusion of the interface surfaces.

16. The method of claim 15 wherein the interface surfaces are simultaneously heated for a period on the order of one second with the surfaces in fixed and abutting engagement, and said step of rotating the elements is provided after the start of the last one-half second of the heating period.

17. The method of claim 16 wherein said step of rotating the element is provided during the last one-half second of the heating period.

18. The method of claim 16 or 17 including rotating the element through an angle of at least 10 degrees.

19. The method of claim 18 including rotating the element through an angle of between 10 degrees and 120 degrees.

20. The method of claim 15 wherein the heating of the interface surfaces is separately and individually completed, and said mounting of the elements is carried out immediately upon completion of the heating of the interface surfaces.

21. The method of claim 20 wherein said heating step includes placing of the elements on a heating platen with the interface surfaces engaging the platen.

22. The method of bonding plastic elements formed of molecular structure including olefin center blocks and styrene end blocks over extended planar interface bonding surfaces, comprising separately heating the bonding surfaces to soften the bonding surfaces independently of movement of said elements, locating the softened bonding surfaces into engagement under pressure, and rotating of the heated elements relative to each other on an axis essentially normal to the bonding surfaces to introduce shear forces into the softened bonding surfaces and thereby causing the softened material to flow.

23. The method of claim 22 wherein the members are rotated through an angle at least on the order of ten degrees.

24. The method of claim 22 wherein the members are rotated through an angle of from ten degrees to one hundred and twenty degrees.

25. The method of claim 22 including the confining of the exposed end edges of the bonding surfaces to control the lateral movement of the softened bonding surfaces.

26. The method of fusion bonding plastic elements comprising introducing susceptor particles at the interface of at least one of the plastic elements, subjecting the particles to high frequency magnetic field for generating heat in said particles and thereby softening the interface surfaces of said elements, and moving said plastic elements relative to each other with the interface surfaces softened for reducing the viscosity of the interface material and creating a fusion bond at the interface surfaces.

27. The method of claim 26 wherein said last named step is initiated only during a terminal portion of the subjecting of the particles to said magnetic field.

28. The method of claim 26 wherein said last named step is provided only after termination of the subjecting of the particles to said magnetic field.

29. The method of anyone of the claims 26, 27 or 28 wherein said particles are selected from the group consisting of gamma $Fe_2O_3$ and $Fe_3O_4$.

30. A method of fusion bonding first and second self-supporting plastic elements aligned with common peripherial walls, said elements being bonded over an extended interface surface extending inwardly from the peripherial walls, comprising heating the interface material to a fusion bonding temperature from a separate thermal energy source independently of movement of said elements and thereby softening the interface material of said plastic elements, holding the interface surfaces while in the softened state in firm engagement, moving the self-supporting elements into increased compressive engagement over the complete bond interface and thereby subjecting the softened interface material to compression and thereby a high rate shear force movement with the separately softened surfaces in continuous engagement to lower the viscosity of the interface material and cause said interface material to bondably flow, and then cooling the interface to create a fusion bond.

31. The method of claim 30 wherein said elements are formed of block polymers having center blocks and end blocks, said elements having particles responsive to a high frequency magnetic field to heat said elements and raise the temperature of the interface surfaces to a melt temperature, and including the step of applying a magnetic field to said elements before said moving of the elements to create the high rate shear force movement.

32. The method of claim 12 wherein the energy field is removed in timed relationship to the step of subjecting the interface material to a shear force movement.

* * * * *

UNITED STATES PATENT AND TRADEMARK OFFICE
CERTIFICATE OF CORRECTION

PATENT NO. : 4,239,575
DATED : December 16, 1980
INVENTOR(S) : Alfred F. Leatherman It is certified that error appears in the above-identified patent and that said Letters Patent are hereby corrected as shown below:

Column 2, Line 35,    After "does" cancel "not";

Line 39,    After "hand" cancel "printing" and substitute therefore --- parting ---;

Column 4, Line 41,    After "heating" cancel "to" and substitute therefore --- of ---;

Column 6, Line 17,    After "opening" cancel "24" and substitute therefore --- 20 ---.

Signed and Sealed this

Nineteenth Day of May 1981

[SEAL]

Attest:

RENE D. TEGTMEYER

Attesting Officer    Acting Commissioner of Patents and Trademarks